United States Patent
Choi

(10) Patent No.: US 9,713,064 B2
(45) Date of Patent: Jul. 18, 2017

(54) SCHEDULE FOR ACCESS TO SHARED WIRELESS MEDIUM BASED ON PROFILE DATA

(71) Applicant: HEWLETT-PACKARD DEVELOPMENT COMPANY, Houstson, TX (US)

(72) Inventor: Byung Kyu Choi, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 8 days.

(21) Appl. No.: 14/760,189

(22) PCT Filed: Mar. 31, 2013

(86) PCT No.: PCT/US2013/034749
§ 371 (c)(1),
(2) Date: Jul. 9, 2015

(87) PCT Pub. No.: WO2014/163608
PCT Pub. Date: Oct. 9, 2014

(65) Prior Publication Data
US 2016/0007266 A1    Jan. 7, 2016

(51) Int. Cl.
*H04J 3/00*    (2006.01)
*H04W 48/04*    (2009.01)
*H04W 74/08*    (2009.01)
*G06F 9/455*    (2006.01)
*H04W 84/12*    (2009.01)

(52) U.S. Cl.
CPC ........ *H04W 48/04* (2013.01); *G06F 9/45558* (2013.01); *H04W 74/08* (2013.01); *G06F 2009/45595* (2013.01); *H04W 84/12* (2013.01)

(58) Field of Classification Search
CPC ..... H04W 48/04; H04W 74/08; H04W 84/12; G06F 9/45558; G06F 2009/45595
See application file for complete search history.

(56) References Cited

U.S. PATENT DOCUMENTS

| | | | |
|---|---|---|---|
| 6,990,116 B1 | 1/2006 | Young et al. | |
| 8,121,101 B2 | 2/2012 | Kalogridis et al. | |
| 8,631,404 B2* | 1/2014 | Laor | G06F 8/65 718/1 |
| 9,319,380 B2* | 4/2016 | Lukacs | H04L 63/0209 |
| 2003/0083095 A1* | 5/2003 | Liang | H04W 72/1215 455/552.1 |
| 2005/0272423 A1 | 12/2005 | Stephens et al. | |
| 2006/0239292 A1 | 10/2006 | Kahana et al. | |
| 2010/0014423 A1 | 1/2010 | Furuskar et al. | |
| 2010/0037296 A1 | 2/2010 | Silverstone | |
| 2010/0046454 A1 | 2/2010 | Wentink | |

(Continued)

OTHER PUBLICATIONS

International Search Report and Written Opinion dated Dec. 27, 2013. Issued on PCT Patent Application No. PCT/US2013/034749 filed on Mar. 31, 2013, Korean Intellectual Property Office.
"Conquering Today's Bring-your-own-device Challenges a Framework for Successful BYOD Initiatives", < http://www.wit.co.th/pdf/Aruba/WP_BYOD.pdf >, Mar. 30, 2012, pp. 1-14.

(Continued)

*Primary Examiner* — Robert Wilson
(74) *Attorney, Agent, or Firm* — Hewlett Packard Enterprise Patent Department

(57) ABSTRACT

A schedule for access to a shared wireless medium by a device is based on profile data and an algorithm.

15 Claims, 5 Drawing Sheets

(56) References Cited

U.S. PATENT DOCUMENTS

| | | | |
|---|---|---|---|
| 2010/0174894 A1* | 7/2010 | Chen | G06F 9/44542 |
| | | | 713/2 |
| 2011/0268054 A1 | 11/2011 | Abraham et al. | |
| 2012/0051342 A1 | 3/2012 | Liu et al. | |
| 2012/0218983 A1 | 8/2012 | Noh et al. | |
| 2012/0263095 A1 | 10/2012 | Quan et al. | |
| 2012/0317568 A1* | 12/2012 | Aasheim | G06F 9/45558 |
| | | | 718/1 |
| 2015/0301850 A1* | 10/2015 | Jeong | G06F 8/63 |
| | | | 718/1 |
| 2016/0007266 A1* | 1/2016 | Choi | H04W 74/08 |
| | | | 370/336 |

OTHER PUBLICATIONS

"Shenick Network Systems DiversifEye Virtual Machine BYOD Test Strategy", <http://www.shenick.com/media_lib/files/diversifEye_BYOD_test_strategy.pdf >, Nov. 5, 2012, pp. 1-11.

European Search report cited in Appl. No. 13880915.7; mailed Jul. 25, 2016; 11 pages.

Junaid Ansari et al: "A flexible MAC development framework for cognitive radio systems", 2011 IEEE Wireless Communications and Networking Conference (WCNC 2011): Cancun, Mexico, Mar. 28-31, 2011, IEEE, Piscataway, NJ, Mar. 28, 2011 (Mar. 28, 2011), pp. 156-161, XP031876245.

Watson; "Understanding the IEEE 802.11ac Wi-Fi Standard", Sep. 2012; 10 pages; <http://www.merunetworks.com/collateral/white-papers/2012-wp-ieee-802-11ac-understanding-enterprise-wlan-challenges.pdf >, Sep. 2012 pp. 1-10.

* cited by examiner

SCHEDULE FOR ACCESS TO SHARED WIRELESS MEDIUM BASED ON PROFILE DATA

CLAIM FOR PRIORITY

The present application is a national stage filing under 35 U.S.C 371 of PCT application number PCT/US2013/034749, having an international filing date of Mar. 31, 2013, the disclosure of which is hereby incorporated by reference in its entirety.

BACKGROUND

Wireless Local Area Networks (LANs) are typically composed of Access Points (APs), wireless controllers, and an access network, through which the traffic between the AP and a wireless controller is tunneled. The AP is usually the first point of contact by wireless devices to the access network. Since the AP is usually a one hop extension to the existing access network, a packet format over the wireless LAN includes the MAC addresses of the wireless device, the AP, and the interface of a first access switch.

The wireless controller usually not only controls the configuration of the AP, but also takes participation in data traffic delivery in many deployed wireless LANs. Although the wired access network did not originally affect the wireless traffic, overall networking demands have affected the wired access network such that the wired access network may be aware of wireless traffic in order not to discriminate the wireless traffic in favor of wired traffic as the volume of wireless traffic has increased exponentially.

BRIEF DESCRIPTION OF THE DRAWINGS

The following detailed description references the drawings, wherein.

DETAILED DESCRIPTION

Figure 1:
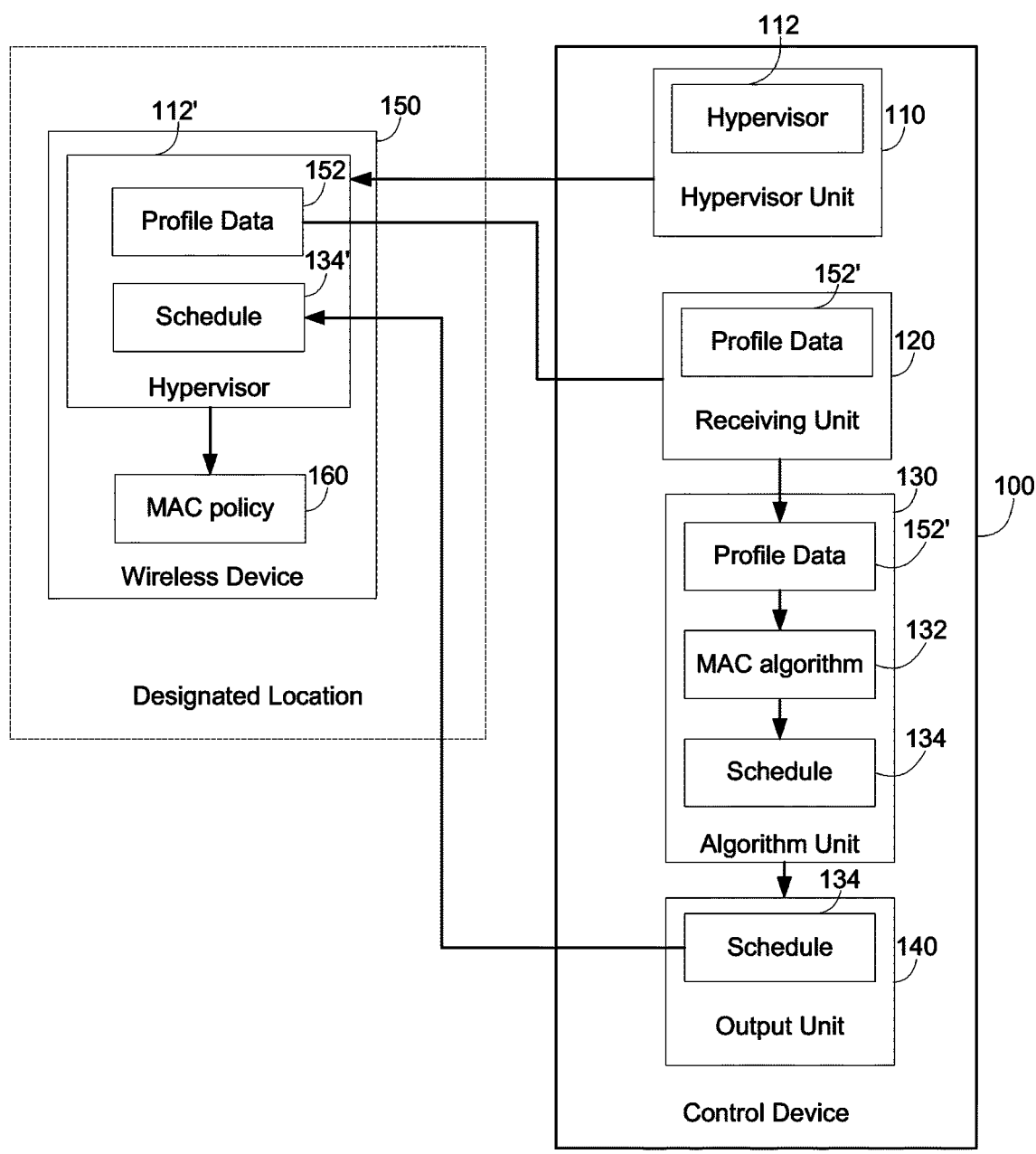
FIG. 1 is an example block diagram of a control device interfacing with a wireless device at a designated location.

Whenever there are multiple wireless devices trying to send a packet over a wireless network, the wireless devices compete to first occupy the wireless channel because there is only a single medium. Further, only one of the wireless devices may communicate with an Access Point (AP) at a time due to the shared wireless medium.

As a result, Media Access Control (MAC) standard policies have been based upon a Carrier Sense Multiple Access/Collision Avoidance (CSMA/CA) framework. This framework may be referred to as Distributed Control Function (DCF). While DCF has paved the road of wireless networking, DCF has also shown to be highly inefficient at maximizing utilization of the wireless bandwidth. Notoriously, DCF runs an exponential random backoff algorithm in an effort to avoid packet collisions without incorporating a good priority system for differentiated packet handling services.

Thus, generally a large portion of the wireless bandwidth may be lost to arbitration of the competition for the shared wireless medium. Consequently, the perceived end user bit rate may be much lower than a maximum achievable wireless bandwidth of the physical layer. While small sized groups may have minor overhead for the competition, large sized groups may suffer much greater overhead, which may be unacceptable in certain scenarios. For example, an employer may have a Bring Your Own Device (BYOD) policy that permits a large number of employees to bring personally owned mobile devices (laptops, tablets, and smart phones) to their workplace, and use those devices to access privileged company information and applications. In this case, the employer and employees may suffer a substantive loss in productivity due to the large overhead of the DCF.

In an effort to address the inefficiency (contention avoidance overhead) of DCF, a Point Coordinated Function (PCF) was introduced. The PCF may use a period of AP-controlled polling (contention free) and the period of contention-based (like DCF) alternately. The two periods may be fixed in terms of time interval. In the period of polling, since only the wireless device selected by the AP is allowed to transmit a packet over wireless without being subject to contention, the perceived end user data rate may be improved by eliminating the high penalty of free contention.

In the recent past, however, other methods have attempted to even further alleviate the limitation imposed by the DCF, such as Enhanced Distributed Channel Access (EDCA) and Hybrid Control Function (HCF) Controlled Channel Access (HCCA). The EDCA and HCCA may employ both contention-based (DCF-style) and contention free-based medium access control (PCF-style) in an effort to accommodate different classes of QoS (Quality of Service) requirements. The EDCA may be considered an enhanced version of the DCF, in which wireless devices contend for a Transmission Opportunity (TXOP) (e.g. a time slot). In the period of TXOP, the selected user may be guaranteed to send packets over wireless without contention. In contrast to the DCF, different Quality of Service (QoS) classes have different priorities to contend for the TXOP. Thus, higher priority classes may wait less to acquire a TXOP than lower priority classes.

The HCCA may be considered an enhanced version of PCF, in which the AP is allowed to allocate a variable amount of time to both contention-free and contention-based periods, which run alternately. In the contention-free period, only the selected wireless device by the AP may be allowed to transmit packets over the shared wireless medium. In the contention-based period, the EDCA may be used. HCCA may also utilize a wireless network global data set including the QoS and traffic backlog at each wireless device to create an optimal time allocation to both contention-free and contention-based periods.

Although the flexibility of HCCA allows for higher bandwidth utilization out of a given wireless network, it may still not be actively employed for various reasons. For example, a wireless network may not be able to determine a priority of each wireless client device due to a dynamic nature of a user group at general hotspots including airports, coffee shops, public libraries, restaurants, and many other public places.

Embodiments may provide a MAC scheduling algorithm that dynamically configures a MAC of a wireless device to improve a bandwidth of shared wireless medium while reducing overhead. For example, an embodiment may include a hypervisor unit, a receiving unit, an algorithm unit and an output unit. The hypervisor unit may transmit a hypervisor to a wireless device, if the wireless device is to be used in a designated location. The receiving unit may receive profile data of the wireless device from the hypervisor at the wireless device. The algorithm unit may determine a schedule for access to a shared wireless medium by the wireless device based on the received profile data and a MAC algorithm to increase a bandwidth utilization of the shared wireless medium. The output unit may output the schedule to the hypervisor at the wireless device. The hypervisor at the wireless device may configure a MAC policy of the wireless device based on the schedule.

Thus, overall wireless bandwidth utilization may be maximized or increased by minimizing or reducing the contention handling overhead and differentiating the services by QoS levels (access or traffic categories). The hypervisor may allow an employer to control and manage the wireless network for the betterment of both the BYOD network experience and business efficiency over the shared wireless medium. Further, a user's private data and an employer's business secrets on the employee-brought machine may be kept separate and protected by the hypervisor.

Referring now to the drawings, FIG. 1 is an example block diagram of a control device 100 interfacing with a wireless device 150 at a designated location. The control device 100 may be included or part of a computer, switch, enclosure, server, controller, Access Point (AP), gateway, hub, and/or any type of device capable of managing network elements, such as the control device 100. The wireless device 150 may be desktop, laptop, slate, tablet, mobile computing device, computer and/or any other type of device capable of wirelessly interfacing with the control device 100.

In FIG. 1, the control device 100 includes a hypervisor unit 110, a receiving unit 120, an algorithm unit 130 and an output unit 140. The hypervisor unit 110, receiving unit 120, algorithm unit 130 and output unit 140 may include, for example, a hardware device including electronic circuitry for implementing the functionality described below, such as control logic and/or memory. In addition or as an alternative, the hypervisor unit 110, receiving unit 120, algorithm unit 130 and output unit 140 may be implemented as a series of instructions encoded on a machine-readable storage medium and executable by a processor.

The hypervisor unit 110 may transmit a hypervisor 112 to the wireless device 150, if the wireless device 150 is to be used in the designated location. For example, the designated location may be a workplace providing access to information and/or an application that is employer privileged. The wireless device 150 may be owned by an employee, such as a BYOD, and an employer may be providing the hypervisor 112 through the hypervisor unit 110. The wireless device 150 may then install the hypervisor 112', and the hypervisor 112' may generate the profile data 152 based on determining a current state of the wireless device 150. For example, the profile data 152 may include information related to an amount of data successfully transmitted by the wireless device 150, an amount of data retransmitted by the wireless device 150, an amount of data of the wireless device 150 that collided, a backlog at the wireless device 150 and a signal strength of the wireless device 150. A distance of the wireless device from an Access Point (AP) may be estimated based on the signal strength. The above profile data may be accumulated based on network activity of the wireless device 150 in the designated location, which may be part of a wireless network of the employer.

The hypervisor 112' may then forward the profile data 152 to the control device 100. The receiving unit 120 of the control device 100 may receive the profile data 152'. The hypervisor 112' may be any combination of computer software, firmware and/or hardware that creates and runs a virtual machine. In one instance, the hypervisor 112' may concurrently host one or more operating systems (OS), where the one or more OSs may be virtual machines that are managed by the hypervisor 112'. The hypervisor 112' may include any type of hardware virtualization technique that allows multiple OSs to run concurrently as guests on a host device, such as the wireless device 150, or the hypervisor 112' could be an OS itself. A functionality of the hypervisor 112' may be flexible and determined according to a user's or employer's specification. For example, the hypervisor 112' may be a Type 1 hypervisor that runs directly on a hardware of the wireless device 150 hardware or a Type 2 hypervisor that runs on an OS (such as FreeBSD, Linux, or Windows) of the wireless device 150.

Next, the algorithm unit 130 may determine a schedule 134 for access to a shared wireless medium by the wireless device 150 based on the received profile data 152' and a Medium Access Control (MAC) algorithm 132 to increase a bandwidth utilization of the shared wireless medium. Examples of the shared wireless medium may include radio waves, microwave, light, visible and infrared (IR), sonic, ultrasonic, electromagnetic, and the like. Some example protocols for communication between the wireless device 150 and the control device 100 over the shared wireless medium may include Wi-Fi technology and cellular data service such as GSM, CDMA, GPRS and 3G networks like W-CDMA, EDGE and CDMA2000. The MAC algorithm 132 will be explained in greater detail with respect to FIGS. 2 and 4.

The output unit 140 may output the schedule 134 to the hypervisor 112' at the wireless device 150. The hypervisor 112' may then configure a MAC policy 160 of the wireless device 150 based on the schedule 134.' For example, the schedule 134' may include instructions and/or data that define a channel access control mechanism. The hypervisor 112' may be capable of reading the schedule 134' and modifying the existing MAC policy 160 of the wireless device 150 based on the read schedule 134'. For instance, the hypervisor 112' may be able to communicate with underlying hardware of the wireless device 150 to re-configure a factory default setting of the wireless MAC.

The MAC policy 160 may refer to settings of the MAC data communication protocol. The MAC data communication protocol may be part of a sublayer of the data link layer. The MAC sublayer may provide addressing and channel access control mechanisms that make it possible for several terminals or network nodes to communicate within a multiple access network that incorporates a shared medium, e.g. Ethernet.

The channel access control mechanisms provided by the MAC layer (e.g. multiple access protocol) allow for several devices to share the same wireless medium. For example, the multiple access protocol may detect or avoid data packet collisions if a packet mode contention based channel access method is used, or reserve resources to establish a logical channel if a circuit switched or channelization based channel access method is used. The channel access control mechanism may rely on a physical layer multiplex scheme.

The factory default multiple access protocol in the wireless device 150 may be set to a contention-based CSMA/CA protocol, which is commonly used in Ethernet networks. This mechanism may only be utilized within a network collision domain, for example an Ethernet bus network or a hub-based star topology network. An Ethernet network may be divided into several collision domains, interconnected by bridges and switches.

The algorithm unit 130 may include an open interface to receive a third-party algorithm and/or an instruction for modifying the existing MAC algorithm 132. Then, then algorithm unit 132 may dynamically determine the schedule 134 based on the received third-party algorithm and/or instruction. The algorithm unit 130 may convert the received profile data 152' to a format receivable by the MAC algorithm 132 and/or may convert the outputted schedule 134 to a format receivable by the hypervisor 112' at the wireless device 150. For example, the profile data 152' may be received in an Ethernet format but may only be accepted as input to the MAC algorithm 132 in a Transmission Control Protocol (TCP) or User Datagram Protocol (UDP) format. Similarly, the schedule 134 may be output in the TCP or UDP format but only receivable by the hypervisor 112' in the Ethernet format.

Figure 2:
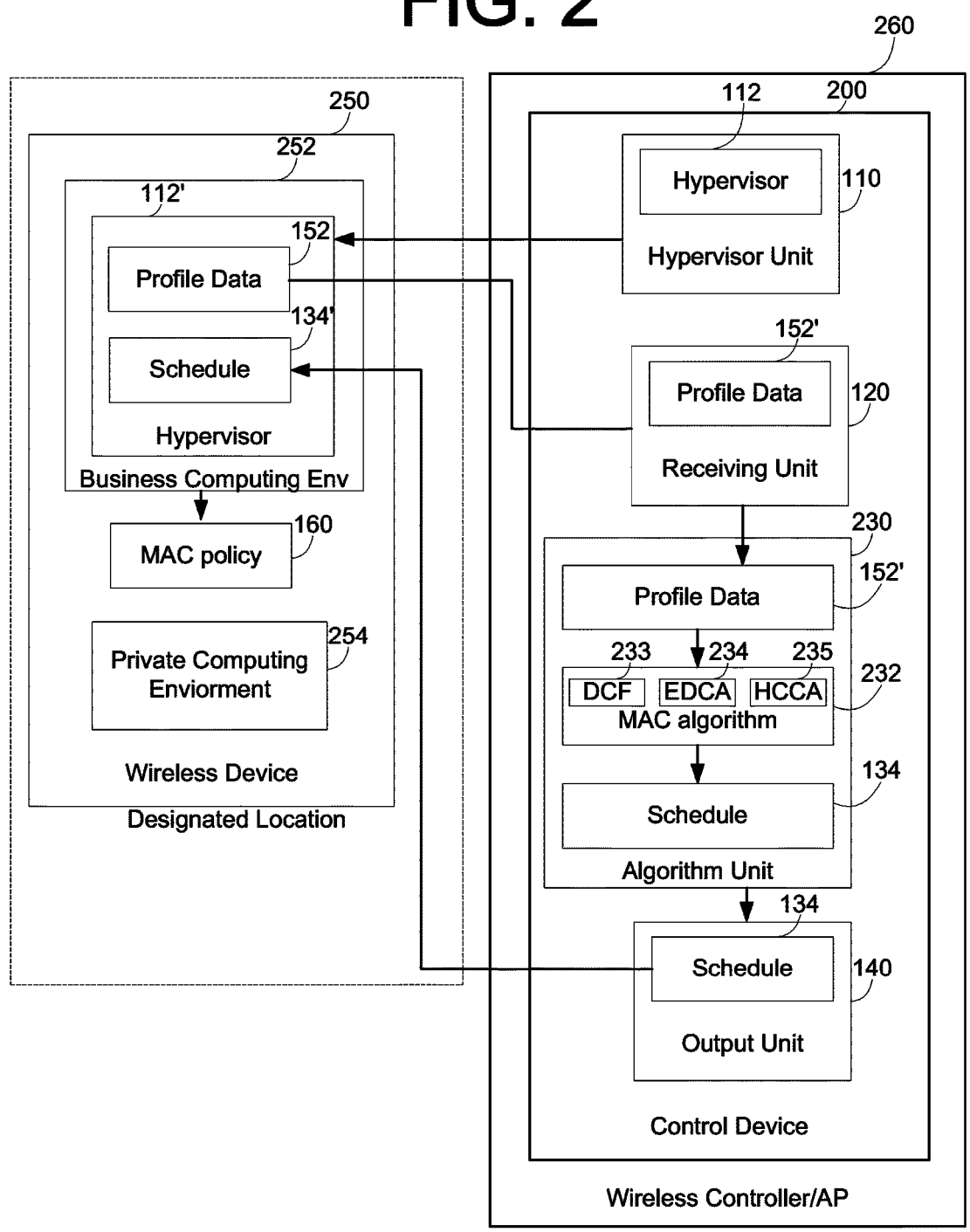
FIG. 2 is another example block diagram of a control device interfacing with a wireless device at a designated location.

FIG. 2 is another example block diagram of a control device 200 interfacing with a wireless device 250 at a designated location. The control device 200 and wireless device 250 of FIG. 2 may respectively include the functionality and/or hardware of the control device 100 and wireless device 150 of FIG. 1. For example, the wireless device 250 includes the MAC policy 160 and the hypervisor 112', where the hypervisor 112' includes the profile data 152 and the schedule 134'. However, the wireless device 250 further includes a business computing environment 252 and a separate private computing environment 254. These environments may be separated, for example, by a physical or logical partition, separate access privileges, separate OSs, and the like.

The private computing environment 254 may be personal in nature and belong to the employee. The business computing environment 252 may belong to the employer on the device and include work-related information and/or software. Here, the hypervisor 112' is shown to be running in the business computing environment 252. For example, in one embodiment, the hypervisor 112' may only have permission to be installed in and/or operate from the business computing environment 252. The schedule 134', which resides with the hypervisor 112', may not affect data and/or use of an application by the employee in the private computing environment 254. Thus, the hypervisor 112' may provide a logical fine line of security between the employee's and employer's private worlds.

Similar to the control device 100 of FIG. 1, the control device 200 of FIG. 2 also includes the hypervisor unit 110, the receiving unit 120 and the output unit 140. In addition, the control device 200 is shown here to be located within an access point (AP) or wireless controller 260 of a wireless network, but may also be included in other types of network elements.

Further, an algorithm unit 230 included in the control device 200 of FIG. 2 may have a MAC algorithm 232 that includes at least the functionality of the MAC algorithm 132 of FIG. 1. The MAC algorithm 232 may determine the schedule 134 based on at least one of a Distributed Coordinated Function (DCF), an Enhanced Distributed Channel Access (EDCA) and a Hybrid Control Function (HCF) Controlled Channel Access (HCCA), as explained in greater detail below with respect to FIG. 4. For example, the MAC algorithm 232 may select one of the DCF, HCF and HCCA for the MAC policy 160 of the wireless device 360, based on analysis of its profile data 152'.

Figure 3:
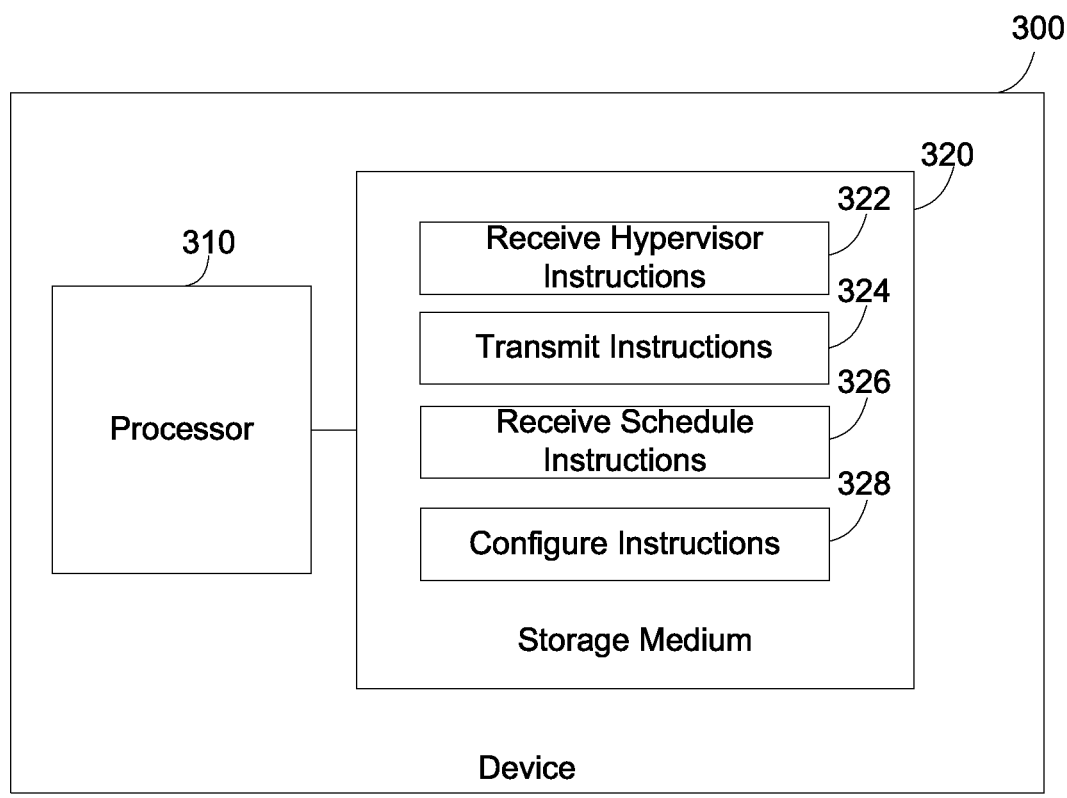
FIG. 3 is an example block diagram of a computing device including instructions for scheduling access to a shared wireless medium.

FIG. 3 is an example block diagram of a computing device 300 including instructions for scheduling access to a shared wireless medium. In the embodiment of FIG. 3, the computing device 300 includes a processor 310 and a machine-readable storage medium 320. The machine-readable storage medium 320 further includes instructions 322, 324, 326 and 328 for scheduling access to a shared wireless medium.

The computing device 300 may be, for example, a server, a notebook computer, a desktop computer, a slate computing device, or any other type of user device capable of executing the instructions 322, 324, 326 and 328. In certain examples, the computing device 300 may include or be connected to additional components such as memories, sensors, displays, etc.

The processor 310 may be, at least one central processing unit (CPU), at least one semiconductor-based microprocessor, at least one graphics processing unit (GPU), other hardware devices suitable for retrieval and execution of instructions stored in the machine-readable storage medium 320, or combinations thereof. The processor 310 may fetch, decode, and execute instructions 322, 324, 326 and 328 for scheduling access to the shared wireless medium. As an alternative or in addition to retrieving and executing instructions, the processor 310 may include at least one integrated circuit (IC), other control logic, other electronic circuits, or combinations thereof that include a number of electronic components for performing the functionality of instructions 322, 324, 326 and 328.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for scheduling access to the shared wireless medium.

Figure 4:
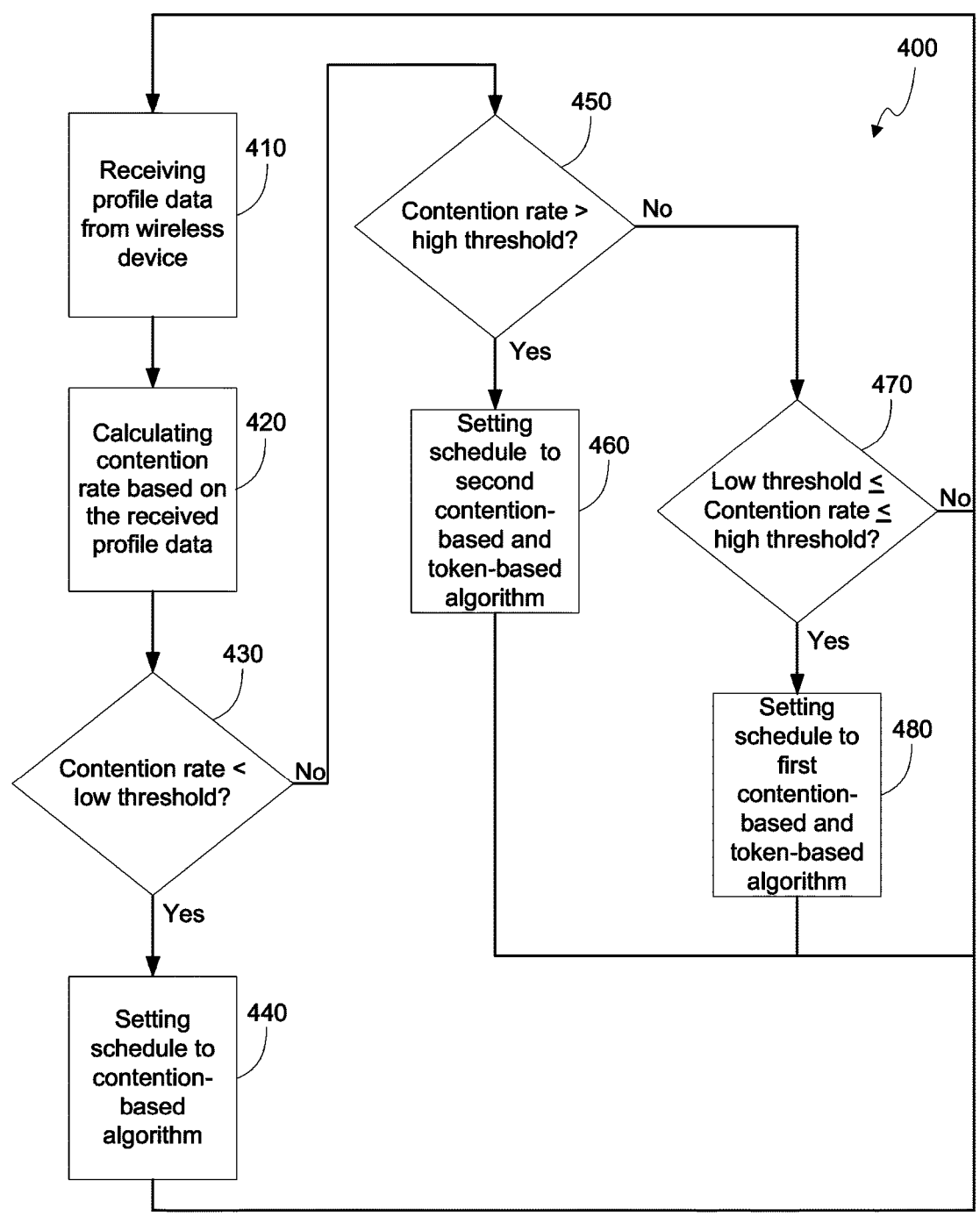
FIG. 4 is an example flowchart of a method for scheduling access to a shared wireless medium.
Figure 5:
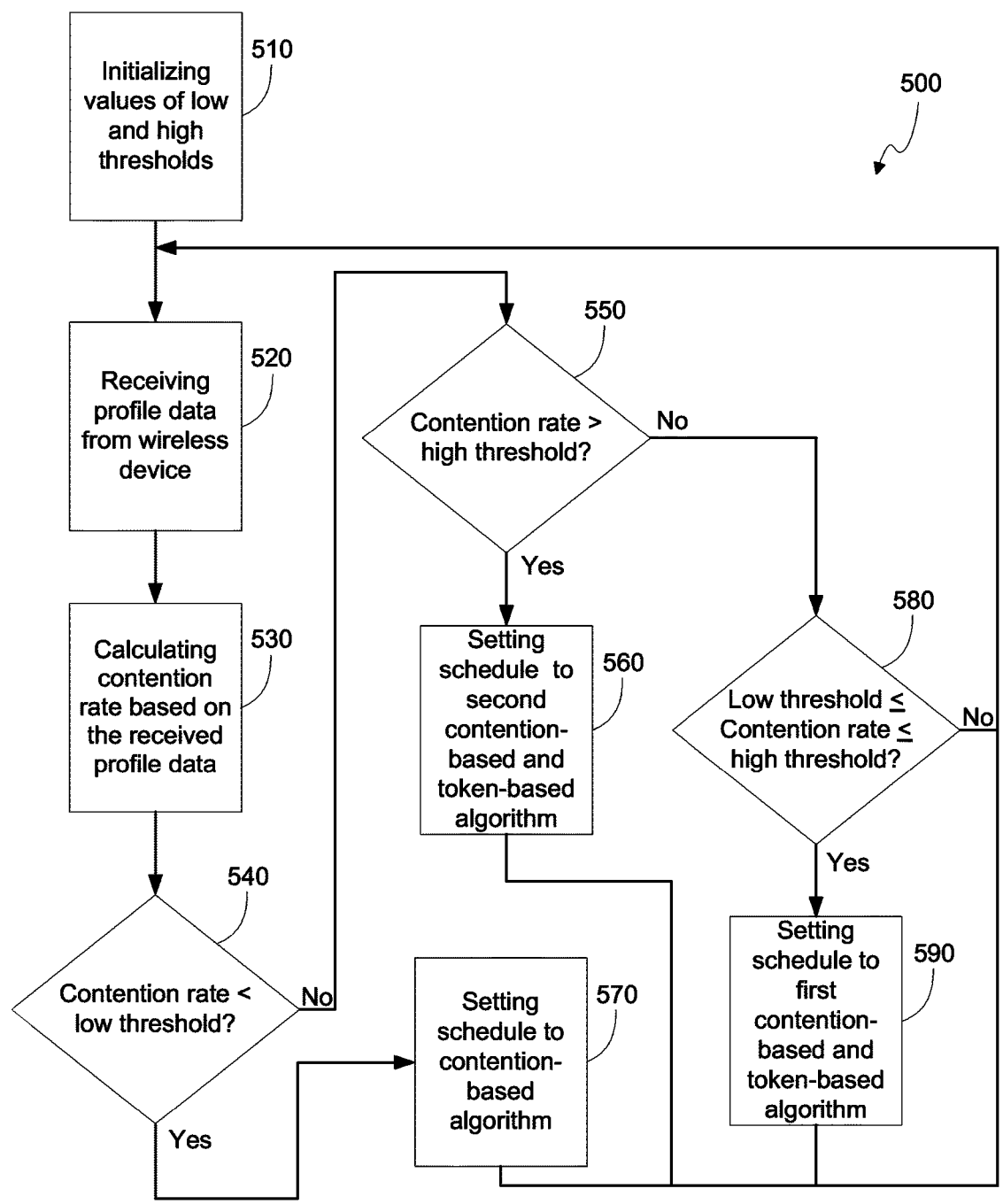
FIG. 5 is another example flowchart of a method for scheduling access to a shared wireless medium.

Moreover, the instructions 322, 324, 326 and 328 when executed by a processor (e.g., via one processing element or multiple processing elements of the processor) can cause the processor to perform processes, such as, the processes of FIGS. 4 and 5. For example, the receive hypervisor instructions 322 may be executed by the processor 310 to receive a hypervisor (not shown) if the device 300 is to be used at a designated location (not shown). The transmit instructions 424 may be executed by the processor 310 to transmit, via the hypervisor, profile data (not shown) related to data transmission by the device 300 to a control device (not shown). The profile data may include a current MAC configuration of the device 300.

The receive schedule instructions 326 may be executed by the processor 310 to receive, from the control device, a schedule (not shown) for access to a shared wireless medium by the device 300 based on the profile data. The schedule may be further based on at least one of a number of other devices accessing the shared wireless medium and a priority assigned to the device 300. The configure instructions 328 may be executed by the processor 310 to configure, via the hypervisor, a Medium Access Control (MAC) policy (not shown) of the device 300 in accordance with the schedule.

The schedule may be determined so as to increase a bandwidth utilization of the shared wireless medium.

FIG. 4 is an example flowchart of a method 400 for scheduling access to a shared wireless medium. Although execution of the method 400 is described below with reference to the control device 200, other suitable components for execution of the method 400 can be utilized, such as the control device 100. Additionally, the components for executing the method 400 may be spread among multiple system and/or devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the control device 200 receives profile data 152' from a wireless device 250 related to at least one of transmission and collision of data at the wireless device 250. For example, the profile data 152' may include information related to at least one of an amount of data successfully transmitted by the wireless device 250, an amount of data retransmitted by the wireless device 250, an amount of data of the wireless device 250 that collided, a backlog at the wireless device 250 and a signal strength of the wireless device 250.

Then, at block 420, the control device 200 calculates a contention rate of the wireless device 250 based on the received profile data 152'. For example, the contention rate may be based on a number of unsuccessful transmission attempts out of a total number of transmission attempts over a time period. Unsuccessful transmission attempts may include data that collided and/or was not able to be transmitted. The total number of transmission attempts may include the data that collided and/or was not able to be transmitted, as well as the data that transmitted and/or retransmitted successfully. For example, the time period may be 1 millisecond (ms) and the contention rate may be 0.15 (e.g., 15 unsuccessful transmission out of 100 total transmissions).

Next, at block 430, the control device 200 compares the contention rate to a low threshold. If the contention rate is less than the low threshold, the method 400 flows to block 440, where the control device 200 sets a schedule 134 of the wireless device 250 for sharing access to a wireless medium according to a contention-based algorithm. For a contention-cased algorithm, any of the wireless devices 250 may attempt to send a packet over the shared wireless medium at any time. Upon collision with another packet sent from another wireless device 250, both of the wireless devices 250 may try to resend the same packets at a later time. An example of the contention-based algorithm may include a Distributed Coordinated Function (DCF).

On the other hand, if the contention rate is greater than or equal to the low threshold, the method 400 flows from block 430 to block 450. At block 450, the control device 200 compares the contention rate to a high threshold. If the contention rate is greater than the high threshold, the method 400 flows to block 460, where the control device 200 sets the schedule 134 of the wireless device 250 for sharing access to a wireless medium according to a first contention-based and token-based algorithm.

For a token-based algorithm, such as PCF, the wireless device 250 may send a packet over the shared wireless medium when it holds a global token. The wireless device 250 then hands over the global token to a next pre-determined wireless device 250 upon the completion of the sending. For a time division-based algorithm, each of the wireless devices 250 may have a unique time slot allocation, in which it will be the only device allowed to send a packet over the shared wireless medium. An example of the first contention-based and token-based algorithm may include an Enhanced Distributed Channel Access (EDCA). A period of a transmission opportunity (TXOP) may be fixed for the ECDA.

However, if the contention rate is less than or equal to the high threshold, the method 400 flows from block 450 to block 470. At block 470, the control device 200 determines if the contention rate is between the low and high thresholds. If the contention rate is between the low and high thresholds, the method 400 flows from block 470 to block 480, where the control device 200 sets the schedule 134 of the wireless device 250 for sharing access to a wireless medium according to a second contention-based and token-based algorithm. An example of the second contention-based and token-based algorithm may include a Hybrid Control Function (HCF) Controlled Channel Access (HCCA).

The low threshold may be less than the high threshold. Further, the high and low thresholds may be determined experimentally, such as, according to an environment of the designated location and/or characteristics of shared wireless medium. Alternatively or additionally, the high and low thresholds may be determined according to a user's and/or administrator's preferences.

The period of the TXOP of the wireless device 250 may be proportional to a size of a backlog of the wireless device 250 for the HCCA. The control device 250 may also include a backlog threshold, such as 50, which indicates a minimum amount of backlog needed before the control 250 changes the period of TXOP. The wireless device 250 may be assigned a priority for the HCCA, with higher priority wireless devices to receive the TXOP sooner than lower priority devices.

The term priority may refer to an importance of the user. For example, an executive's wireless device may have higher priority than staffs wireless device. In another example, a presenter's wireless device may have higher priority than an audience member's wireless device. Thus, different priority level users may have different schedules 134'. When two users have a same priority, each of the user's contention rates may be used to determine the period of the TXOP for user's wireless devices.

The control device 250 may receive the profile data 152' every sampling period. The control device 200 may determine an interval of the sampling period dynamically. In one embodiment, a low period, a high period and a delta may be set, such as according to experimentation, preferences and/or guidelines. For example, the low period may be set to 0.5 seconds (s), the high period may be set to 5 s and the delta may be set to 0.5 s. If the algorithm unit 230 produces the same schedule 134 for two consecutive sampling periods, the control device may 200 may calculate a new sampling period by adding the delta to a current sampling period. If the new sampling period is less than the high period, then the new sampling period is used for a next sampling period. However, if the new sampling period is greater than or equal to the high period, then the current sampling period is maintained for the next sampling period.

On the other hand, if the algorithm unit 230 produces a different schedule 134 after the current sampling period, the control device may 200 may calculate the new sampling period by subtracting the delta from the current sampling period. If the new sampling period is greater than the low period, then the new sampling period is used for the next sampling period. However, if the new sampling period is less than or equal to the low period, then the current sampling period is maintained for the next sampling period.

FIG. 5 is another example flowchart of a method 500 for scheduling access to a shared wireless medium. Although execution of the method 500 is described below with reference to the control device 200, other suitable components for execution of the method 500 can be utilized, such as the control device 100. Additionally, the components for executing the method 500 may be spread among multiple system and/or devices (e.g., a processing device in communication with input and output devices). In certain scenarios, multiple devices acting in coordination can be considered a single device to perform the method 500. The method 500 may be implemented in the form of executable instructions stored on a machine-readable storage medium, such as storage medium 320, and/or in the form of electronic circuitry.

At block 510, the control device 250 initializes the values of the low threshold and the high threshold. At block 520, the control device 200 receives profile data 152' from the wireless device 250 related to at least one of transmission and collision of data at the wireless device 250. Then, at block 530, the control device 200 calculates a contention rate of the wireless device 250 based on the received profile data 152'.

Next, at block 540, the control device 200 compares the contention rate to the low threshold. If the contention rate is less than the low threshold, the method 500 flows to block 550, where the control device 200 sets the schedule 134 of the wireless device 250 for sharing access to the wireless medium according to a contention-based algorithm. An example of the contention-based algorithm may include the DCF.

On the other hand, if the contention rate is greater than or equal to the low threshold, the method 500 flows from block 540 to block 550. At block 550, the control device 200 compares the contention rate to the high threshold. If the contention rate is greater than the high threshold, the method 500 flows to block 560, where the control device 200 sets the schedule 134 of the wireless device 250 for sharing access to the wireless medium according to the first contention-based and token-based algorithm. An example of the first contention-based and token-based algorithm may include the EDCA.

However, if the contention rate is less than or equal to the high threshold, the method 500 flows from block 550 to block 580. At block 470, the control device 200 determines if the contention rate is between the low and high thresholds. If the contention rate is between the low and high thresholds, the method 500 flows from block 580 to block 590, where the control device 200 sets the schedule 134 of the wireless device 250 for sharing access to the wireless medium according to a second contention-based and token-based algorithm. An example of the second contention-based and token-based algorithm may include the HCCA.

Specific details are given in the above description to provide an understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

I claim:

1. A control device, comprising:
a hypervisor unit to transmit a hypervisor to a wireless device, if the wireless device is to be used in a designated location;
a receiving unit to receive profile data of the wireless device from the hypervisor at the wireless device;
an algorithm unit to determine a schedule for access to a shared wireless medium by the wireless device based on the received profile data and a Medium Access Control (MAC) algorithm to increase a bandwidth utilization of the shared wireless medium; and
an output unit to output the schedule to the hypervisor at the wireless device, wherein
the hypervisor at the wireless device is to configure a MAC policy of the wireless device based on the schedule.

2. The control device of claim 1, wherein the control device is located within at least one of an access point (AP) and a wireless controller of a wireless network.

3. The control device of claim 1, wherein the MAC algorithm determines the schedule based on at least one of a Distributed Coordinated Function (DCF), an Enhanced Distributed Channel Access (EDCA) and a Hybrid Control Function (HCF) Controlled Channel Access (HCCA).

4. The control device of claim 1, wherein,
the wireless device is owned by an employee,
an employer provides the hypervisor, and
the designated location is a workplace providing access to at least one of information and an application that is employer privileged.

5. The control device of claim 1, wherein,
the profile data includes information related to at least one of an amount of data successfully transmitted by the wireless device, an amount of data retransmitted by the wireless device, an amount of data of the wireless device that collided, a backlog at the wireless device and a signal strength of the wireless device, and
a distance of the wireless device from an Access Point (AP) is estimated based on the signal strength.

6. The control device of claim 1, wherein,
the algorithm unit includes an open interface to receive at least one of a third-party algorithm and an instruction for modifying the MAC algorithm, and
the algorithm unit is to dynamically determine the schedule based on the received at least one of third-party algorithm and instruction.

7. The control device of claim 1, wherein,
the wireless device includes a private computing environment of the employee and a business computing environment of the employer on the device, and
the schedule does not affect at least one of data and use of an application by the employee in the private computing environment.

8. The control device of claim 1, wherein the algorithm unit is to convert at least one of the received profile data to a format receivable by the MAC algorithm and the outputted schedule to a format receivable by the hypervisor at the wireless device.

9. A method, comprising:
receiving profile data from a wireless device related to at least one of transmission and collision of data at the wireless device;
calculating a contention rate of the wireless device based on the received profile data;

setting a schedule of the wireless device for sharing access to a wireless medium according to a contention-based algorithm if the contention rate is less than a low threshold;

setting the schedule of the wireless device for sharing access to the wireless medium according to a first contention-based and token-based algorithm if the contention rate is greater than a high threshold; and setting the schedule of the wireless device for sharing access to the wireless medium according to a second contention-based and token-based algorithm if the contention rate is between the low and high thresholds, configuring a MAC policy of the wireless device based on the schedule.

10. The method of claim 9, further comprising:

initializing values of the low threshold and the high threshold, before receiving the profile data, wherein the low threshold is less than the high threshold.

11. The method of claim 9, wherein, the contention-based algorithm includes a Distributed Coordinated Function (DCF), the first contention-based and token-based algorithm includes an Enhanced Distributed Channel Access (EDCA), the second contention-based and token-based algorithm includes a Hybrid Control Function (HCF) Controlled Channel Access (HCCA), and the contention rate is based on a number of unsuccessful transmission attempts out of a total number of transmission attempts.

12. The method of claim 9, wherein, a period of a transmission opportunity (TXOP) is fixed for an Enhanced Distributed Channel Access (EDCA), the period of the TXOP of the wireless device is proportional to a size of a backlog of the wireless device for a Hybrid Control Function (HCF) Controlled Channel Access (HCCA), and the wireless device is assigned a priority for the HCCA, with higher priority wireless devices to receive the TXOP sooner than lower priority devices.

13. The method of claim 9, wherein, receiving the profile data includes receives the profile data every sampling period, a new interval of the sampling period is determined by adding a delta to a current interval of the sampling period, if the schedule is same for consecutive sampling periods, the new interval of the sampling period is determined by subtracting the delta from the current interval of the sampling period, if the schedule is different for the consecutive sampling periods, and the new interval of the sampling period is used for a next interval of the sampling period, if the new interval is at least one of less than a high period and greater than a low period.

14. A non-transitory computer-readable storage medium storing instructions that, if executed by a processor of a device, cause the processor to:

receive a hypervisor if the device is to be used at a designated location;

transmit, via the hypervisor, profile data related to data transmission by the device to a control device;

receive, from the control device, a schedule for access to a shared wireless medium by the device based on the profile data; and configure, via the hypervisor, a Medium Access Control (MAC) policy of the device in accordance with the schedule, wherein the schedule is determined to increase a bandwidth utilization of the shared wireless medium.

15. The non-transitory computer-readable storage medium of claim 14, wherein, the profile data is to include a current MAC configuration of the device, and the schedule is further based on at least one of a number of other devices accessing the shared wireless medium and a priority assigned to the device.

* * * * *